Patented June 25, 1940

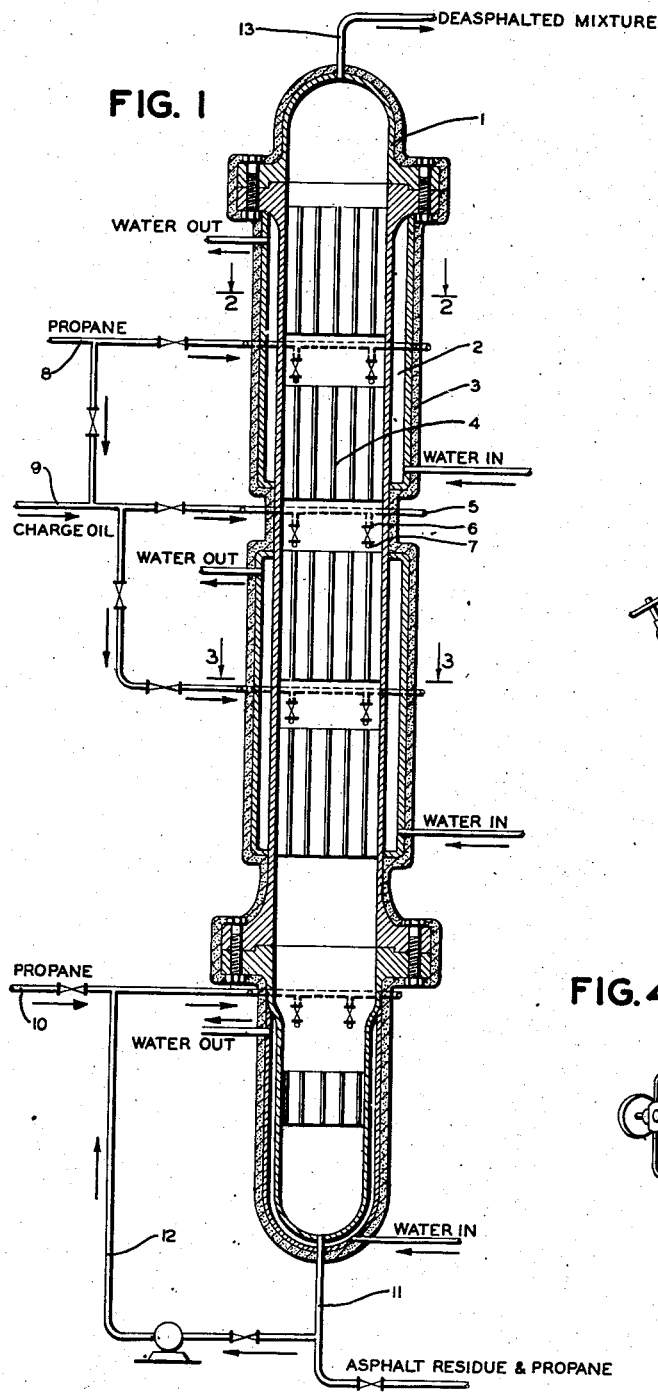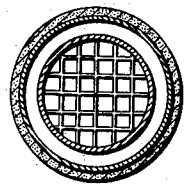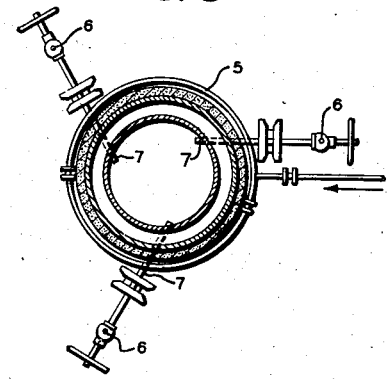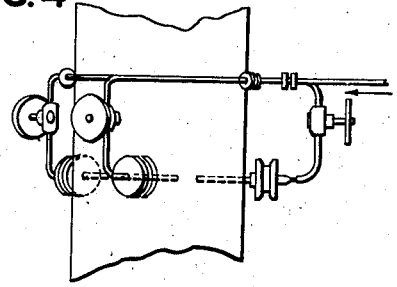

2,205,986

UNITED STATES PATENT OFFICE 2,205,986

APPARATUS FOR THE COUNTERCURRENT EXTRACTION OF HYDROCARBON OIL WITH A SOLVENT

Theodore A. Mangelsdorf, Charles T. Anné, and Herman I. Wilson, Port Arthur, Tex., assignors to The Texas Company, New York, N. Y., a corporation of Delaware Application December 30, 1938, Serial No. 248,376

6 Claims. (Cl. 196—46)

This invention relates to apparatus useful in the treatment of hydrocarbon oil with a solvent and is particularly adapted for effecting continuous removal of asphaltic constituents from hydrocarbon oil such as mineral lubricating oil stocks.

In pending application, Serial No. 214,487, filed June 18, 1938, for "Removal of asphalt from hydrocarbon oil," one of the present joint inventors describes a continuous method of removing asphalt from hydrocarbon oil in the presence of a solvent such as a liquefied normally gaseous petroleum hydrocarbon. The method involves effecting continuous removal of asphalt from the oil in a separating vessel wherein the asphalt-bearing oil and solvent are subjected to countercurrent contact. As a result of such contact the mixture is separated into phases, one of which comprises oil and solvent substantially free from asphalt, while the other comprises a mixture of asphalt and some solvent. These phases are continuously withdrawn from the separator and a portion of the withdrawn asphalt phase returned to the separating vessel, together with fresh solvent.

The present invention concerns apparatus found to be particularly suitable for separating asphalt from oil by the foregoing method.

Broadly, the apparatus contemplated, comprises a vertical countercurrent treating vessel provided with cellular baffle sections or grids spaced at vertical intervals within the vessel. Nozzles are provided for introducing the solvent and oil tangentially to the intervening spaces within the tower between adjacent pairs of grids. The nozzles in the upper portion of the vessel are adapted to introduce solvent to the interior of the vessel, while those at somewhat lower points in the vessel are adapted to introduce asphalt-bearing oil alone or mixed with solvent. Nozzles near the bottom of the tower provide for admission of solvent at that point. The purpose of the nozzles is to inject the liquid into the tower at sufficiently high velocity to effect agitation and thorough mixing of the liquids existing within the portions of the treating vessel into which the nozzles project.

Thus, the oil and solvent are subjected to agitation and mixing at a series of points throughout the treating vessel. Between successive mixings the liquids are caused to flow through the intervening baffle sections or grids in a relatively quiescent condition.

The baffle sections are designed to permit non-turbulent flow of the liquid therethrough, the liquid as it flows therethrough being substantially free from agitation. In this way the swirling action caused by the discharge of liquid through the nozzles is confined to the portion of the vessel in the immediate vicinity of the nozzles. At intervening points within the vessel the liquid is in a relatively quiescent condition.

In short, the single treating vessel of the present invention provides means within its interior for subjecting the oil and solvent to alternate turbulent and non-turbulent flow.

Reference will now be made to the figures of the accompanying drawing in order to describe the apparatus in greater detail:

As indicated in Figure 1, which is a vertical sectional view of a preferred form of countercurrent treating apparatus, there is provided a closed vertical vessel 1 provided with annular jackets 2 through which either a heating or cooling medium, such as water, for example, may be passed for the purpose of maintaining suitable conditions of temperature within the vessel. As shown, the jacket may be in the form of individual sections so that, if desired, different temperatures may be maintained at different points within the vessel.

The exterior of the jacketed vessel is advantageously covered with insulating material 3 as shown.

Within the vessel 1 are baffle sections 4, disposed one above the other, and spaced apart from each other.

As indicated in Figure 2, which is a cross-sectional view, taken on line 2—2 of Figure 1, these baffle sections are of cellular or honeycomb construction, comprising a plurality of vertical conduits or passages, which, it is contemplated, may be circular as well as rectangular in cross-section. Although the dimensions of the conduits or passages may vary over a wide range, we prefer that they have an inside cross-sectional area the greatest dimension of which is not more than one-quarter of the inside diameter of the vessel. As regards the length of the passages, we prefer that the same be not less than ten times the greatest dimension of the cross-sectional area of one of the passages. It is to be understood that the lower limit of the cross-sectional area of the conduits is determined both by structural limitations as well as by that cross-sectional area at which plugging occurs. Likewise, the upper limit of the length of the passages is determined by structural and economic limitations which are readily apparent to anyone skilled in the art.

Ring manifold feed pipes 5 surround and are attached to the exterior of the vessel at successive points throughout its vertical length, these points corresponding to the intervening spaces within the vessel between adjacent pairs of baffle sections 4.

These manifolds connect by means of valved pipes 6 to nozzles 7, as shown in Figures 3 and 4, Fig. 3 being a cross-sectional view taken on line 3—3 of Fig. 1, and Fig. 4 being an elevational detail view of the ring manifold feed pipe system. These nozzles project tangentially through the jacketed wall of the vessel 1 so that the liquid discharged through each nozzle is discharged tangentially with respect to the interior wall of the vessel 1, thereby imparting a swirling action to the liquid at this point within the vessel.

A charge pipe 8 connects with the upper ring manifold to permit introducing either solvent or oil to the vessel at this point.

The main body of charge oil, advantageously mixed with some solvent, is introduced through a pipe 9 connecting with the ring manifolds located in the middle portion of the vessel. Valves are provided to permit adjusting the amount of oil charge to each manifold.

The asphaltic constituents precipitated from the oil accumulating in the bottom of the vessel 1 are mixed with some solvent. This accumulated material is drawn off through a pipe 11 and a portion is returned to the vessel through a pipe 12 connecting with the lowermost manifold.

The deasphalted mixture comprising oil substantially free from asphalt, mixed with the major proportion of the solvent, accumulates in the top of the tower from which it is withdrawn through a pipe 13.

The withdrawn liquid may be conducted to suitable tanks, or to stills, wherein the solvent is stripped from the oil or asphalt, as the case may be.

In the usual operation of the treating vessel asphalt-bearing oil, either alone or mixed with a suitable proportion of a solvent, such as propane, is introduced to the middle portion of the vessel. The vessel is maintained under suitable conditions of temperature such that the asphaltic constituents are substantially insoluble in the oil. As a result, the asphaltic constituents are precipitated from the mixture and flow downwardly through the vessel, while the asphalt-free oil and solvent move upwardly therethrough.

A portion of the asphaltic residue being continuously withdrawn from the bottom of the vessel is returned to the lower portion thereof, together with an additional quantity of solvent.

The additional solvent introduced at this point, in rising upwardly through the tower comes into countercurrent contact with the downwardly flowing asphalt phase and thus washes additional oil from the asphalt. The oil thus washed or extracted from the asphalt flows upwardly through the tower.

Additional propane in relatively small proportion can, if desired, be introduced near the top of the tower for further washing or to precipitate remaining asphaltic constituents.

Thus, it will be seen that the baffle sections eliminate eddy-currents and provide a settling region where precipitated asphaltic material may settle out on its way to the next lower stage within the vessel.

While annular jackets have been illustrated above for regulating the temperature conditions prevailing within the vessel, it is contemplated that other means of maintaining the temperature may be used, as, for example, cooling or heating coils placed within the interior of the vessel. Moreover, the temperature may be controlled entirely or in part by adjusting the temperature of the entering liquids.

It is, of course, to be understood that where liquefied normally gaseous solvents, such as propane, are being used as the treating agent, vessel 1 must be capable of withstanding relatively high pressures sufficient to maintain the solvent in a liquefied condition.

While the apparatus has been described with particular reference to the deasphalting of lubricating oil stocks, its application in other fields is also contemplated, as, for example, in the extraction of lubricating oil or other petroleum fractions with selective solvents wherein the oil is separated into liquid extract and raffinate phases.

Obviously many modifications and variations of the invention as hereinbefore set forth may be made without departing from the spirit and scope thereof, and therefore only such limitations should be imposed as are indicated in the appended claims.

We claim:

1. A countercurrent extraction tower adapted for continuous deasphalting of hydrocarbon oil in the presence of a liquefied normally gaseous petroleum hydrocarbon comprising a vertical vessel, a plurality of cellular grids spaced at vertical intervals throughout the vessel, each of said grids comprising a plurality of vertical conduits, said conduits having a relatively large cross-sectional area sufficient to permit non-turbulent flow of liquid therethrough and the length of each conduit being at least ten times the greatest dimension of its cross-sectional area, and means for subjecting the liquid flowing through the vessel to agitation within the intervening spaces between adjacent pairs of grids.

2. A countercurrent extraction tower adapted for continuous deasphalting of hydrocarbon oil in the presence of a liquefied normally gaseous petroleum hydrocarbon comprising a vertical cylindrical vessel, a plurality of cellular grids spaced at vertical intervals throughout the vessel, each of said grids comprising a plurality of vertical conduits, said conduits having a relatively large cross-sectional area sufficient to permit non-turbulent flow of liquid therethrough and the length of each conduit being at least ten times the greatest dimension of its cross-sectional area, and nozzles for introducing liquid to the intervening spaces within the vessel between adjacent pairs of grids, said nozzles being disposed so as to introduce the liquid in a direction tangential to the inner circumferential wall of the vessel.

3. Apparatus for continuous countercurrent treatment of a liquid with another liquid of different density comprising a vertical vessel, means for introducing the liquid of lesser density to the lower portion of the vessel, means for introducing the liquid of greater density to the upper portion thereof, cellular grids spaced at vertical intervals within the vessel, each of said grids comprising a plurality of vertical conduits, said conduits having a relatively large cross-sectional area sufficient to permit non-turbulent flow of liquid therethrough and the length of each conduit being at least ten times the greatest dimension of its cross-sectional area, means for subjecting the liquid flowing through the vessel to agitation within the intervening spaces between adjacent pairs of grids, and means for separately withdrawing the liquid accumulating in the end portions of said vessel.

4. Apparatus for continuous countercurrent treatment of a liquid with another liquid of different density comprising a vertical vessel, a plurality of cellular grids spaced at vertical intervals throughout the vessel, each of said grids comprising a plurality of vertical conduits, said conduits having a relatively large cross-sectional area sufficient to permit non-turbulent flow of liquid therethrough and the length of each conduit being at least ten times the greatest dimension of its cross-sectional area, a plurality of horizontally disposed nozzles projecting tangentially into the intervening spaces within said vessel between adjacent pairs of grids, means for introducing a liquid of lesser density to nozzles in the lower portion of said vessel, means for introducing a liquid of heavier density to nozzles in the upper portion of said vessel, and means for separately withdrawing from the opposite ends of said vessel the liquid accumulating therein.

5. A tower adapted for the continuous countercurrent treatment of oil with a solvent having a density less than oil and adapted to precipitate and remove asphaltic constituents from the oil, comprising a vertical vessel, cellular grids spaced at vertical intervals throughout said vessel, each of said grids comprising a plurality of vertical conduits, said conduits having a relatively large cross-sectional area sufficient to permit non-turbulent flow of liquid therethrough and the length of each conduit being at least ten times the greatest dimension of its cross-sectional area, horizontally disposed nozzles projecting tangentially into the intervening spaces within the vessel between each pair of adjacent grids, means for introducing solvent under high velocity to the nozzles in the lower portion of the vessel, means for introducing the asphalt-bearing oil to nozzles in the mid-portion of said vessel, means for withdrawing oil substantially free from asphalt and mixed with solvent from the top of the vessel, means for withdrawing asphaltic residue from the bottom of said vessel, and means for returning a portion of the withdrawn residue to the bottom of said vessel.

6. A tower adapted for the continuous countercurrent treatment of oil with a solvent having a density less than oil and adapted to precipitate and remove asphaltic constituents from the oil, comprising a vertical vessel, means for maintaining desired conditions of temperature within the vessel, cellular grids spaced at vertical intervals throughout said vessel, each of said grids comprising a plurality of vertical conduits, said conduits having a relatively large cross-sectional area sufficient to permit non-turbulent flow of liquid therethrough and the length of each conduit being at least ten times the greatest dimension of its cross-sectional area, horizontally disposed nozzles projecting tangentially into the intervening spaces within the vessel between each pair of adjacent grids, means for introducing solvent under high velocity to the nozzles in the lower portion of the vessel, means for introducing the asphalt-bearing oil to nozzles in the mid-portion of said vessel, means for withdrawing oil substantially free from asphalt and mixed with solvent from the top of the vessel, means for withdrawing asphaltic residue from the bottom of said vessel, and means for returning a portion of the withdrawn residue to the bottom of said vessel.

THEODORE A. MANGELSDORF.
CHARLES T. ANNÉ.
HERMAN I. WILSON.